United States Patent
Frisky et al.

(10) Patent No.: US 9,221,063 B2
(45) Date of Patent: Dec. 29, 2015

(54) ELECTRO-SEPARATION OF OIL-BASED DRILLING FLUIDS

(71) Applicants: Sean Frisky, Regina (CA); Jason Beaudin, Regina (CA); Justin Lee, Regina (CA); Joel Wolensky, Regina (CA)

(72) Inventors: Sean Frisky, Regina (CA); Jason Beaudin, Regina (CA); Justin Lee, Regina (CA); Joel Wolensky, Regina (CA)

(73) Assignee: Sean Frisky, Regina, Saskatchewan (CA)

( * ) Notice: Subject to any disclaimer, the term of this patent is extended or adjusted under 35 U.S.C. 154(b) by 438 days.

(21) Appl. No.: 13/889,809

(22) Filed: May 8, 2013

(65) Prior Publication Data

US 2014/0332385 A1  Nov. 13, 2014
US 2015/0283554 A9  Oct. 8, 2015

(30) Foreign Application Priority Data

May 8, 2012  (CA) .................................. 2776215

(51) Int. Cl.
| C02F 1/46 | (2006.01) |
| B03C 5/02 | (2006.01) |
| B01D 21/00 | (2006.01) |
| B01D 21/28 | (2006.01) |
| B01D 17/06 | (2006.01) |
| B03C 11/00 | (2006.01) |
| B03C 5/00 | (2006.01) |

(52) U.S. Cl.
CPC . *B03C 5/02* (2013.01); *B01D 17/06* (2013.01); *B01D 21/0009* (2013.01); *B01D 21/283* (2013.01); *B03C 5/00* (2013.01); *B03C 11/00* (2013.01); *B01D 2221/04* (2013.01); *B03C 2201/02* (2013.01)

(58) Field of Classification Search
CPC ......... B03C 5/02; B03C 5/00; B01D 21/0009
See application file for complete search history.

(56) References Cited

U.S. PATENT DOCUMENTS

| 3,162,592 | A |  | 12/1964 | Pohl |
| 4,370,885 | A |  | 2/1983 | Alekhin |
| 4,400,266 | A |  | 8/1983 | Mamadzhanov |
| 5,005,406 | A |  | 4/1991 | Jasinski |
| 5,795,484 | A |  | 8/1998 | Greenwald |
| 6,139,710 | A | * | 10/2000 | Powell ..................... C02F 1/52 |
|  |  |  |  | 204/672 |
| 7,252,752 | B2 |  | 8/2007 | Holland |
| 7,686,933 | B2 |  | 3/2010 | Browne |
| 7,935,237 | B2 |  | 5/2011 | Carrier |
| 2008/0217065 | A1 |  | 9/2008 | Mccosh |
| 2012/0292186 | A1 |  | 11/2012 | Adamson |

FOREIGN PATENT DOCUMENTS

| CA | 1149776 | 9/1985 |
| JP | S58145793 | 8/1983 |
| WO | WO2011073704 | 6/2011 |

* cited by examiner

*Primary Examiner* — Arun S Phasge
(74) *Attorney, Agent, or Firm* — Standley Law Group LLP

(57) ABSTRACT

A method and apparatus for separating drilling fluid is provided. A housing is provided with a number of vertical parallel spaced apart electrode plates within. The housing is filled with a batch of drilling fluid so that the drilling fluid fills up the spacings between the electrode plates and the drilling mud is subjected to an electro-separation cycle by placing a DC voltage across the electrode plates so that adjacent plates have opposite polarity and an electric field is created in the drilling fluid in the spacings between the electrode plates. During the electro-separation cycle, periodically subjecting the drilling fluid to a vibration cycle by inducing vibrations in the drilling fluid. When the treatment of the drilling fluid is completed, removing an upper layer of fluid from the housing.

79 Claims, 4 Drawing Sheets

ELECTRO-SEPARATION OF OIL-BASED DRILLING FLUIDS

The present invention relates to an apparatus and method for separating oil-based drilling fluids from all-oil drilling muds and invert muds. More particularly, the invention is directed to a method and system that uses electro-separation to separate the drilling fluid.

BACKGROUND

Invert emulsion drilling fluid (commonly called drilling mud) is used when drilling boreholes in the ground, such as for drilling oil or gas wells, etc. It is typically pumped through the drill string and out a nozzle on the drill bit during the drilling of the hole so that the drilling fluid can keep the drill bit cool and carry rock, clay and other solids (commonly referred to as cuttings) removed from the well by the drill bit up the annulus of the well and back to the surface.

Invert emulsion drilling fluids are typically water based or oil based. Oil based muds usually contain oil in the form of a petroleum product similar to diesel fuel. In addition to the oil, these oil based drilling fluids can also contain viscosifiers, weighting agents and other filtrate control additives. To remove the cuttings from the drilling fluid that has been returned to the surface, solids control equipment in the form of shakers, conveyors, centrifuges, etc. are used to remove the majority of the native clays or drill solids that make up the cuttings.

However, these solids control equipment are not designed to re-capture the base oils necessary to create the drilling fluids. It is the presence of hydrocarbons which are physically and chemically bound to the fines, as well as additives, that make separation and recapture through conventional means difficult.

SUMMARY OF THE INVENTION

In an aspect, a method for separating drilling fluid is provided. The method comprises: providing a housing; providing a plurality of parallel spaced apart electrode plates in the housing, each electrode plate oriented substantially vertically; filling the housing with a batch of drilling fluid so that the drilling fluid fills up the spacings between the electrode plates; subjecting the drilling fluid to an electro-separation cycle by placing a DC voltage across the electrode plates so that adjacent plates have opposite polarity and an electric field is created in the drilling fluid in the spacings between the electrode plates; periodically subjecting the drilling fluid to a vibration cycle by inducing vibrations in the drilling fluid; and removing an upper layer of fluid from the housing.

The following is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
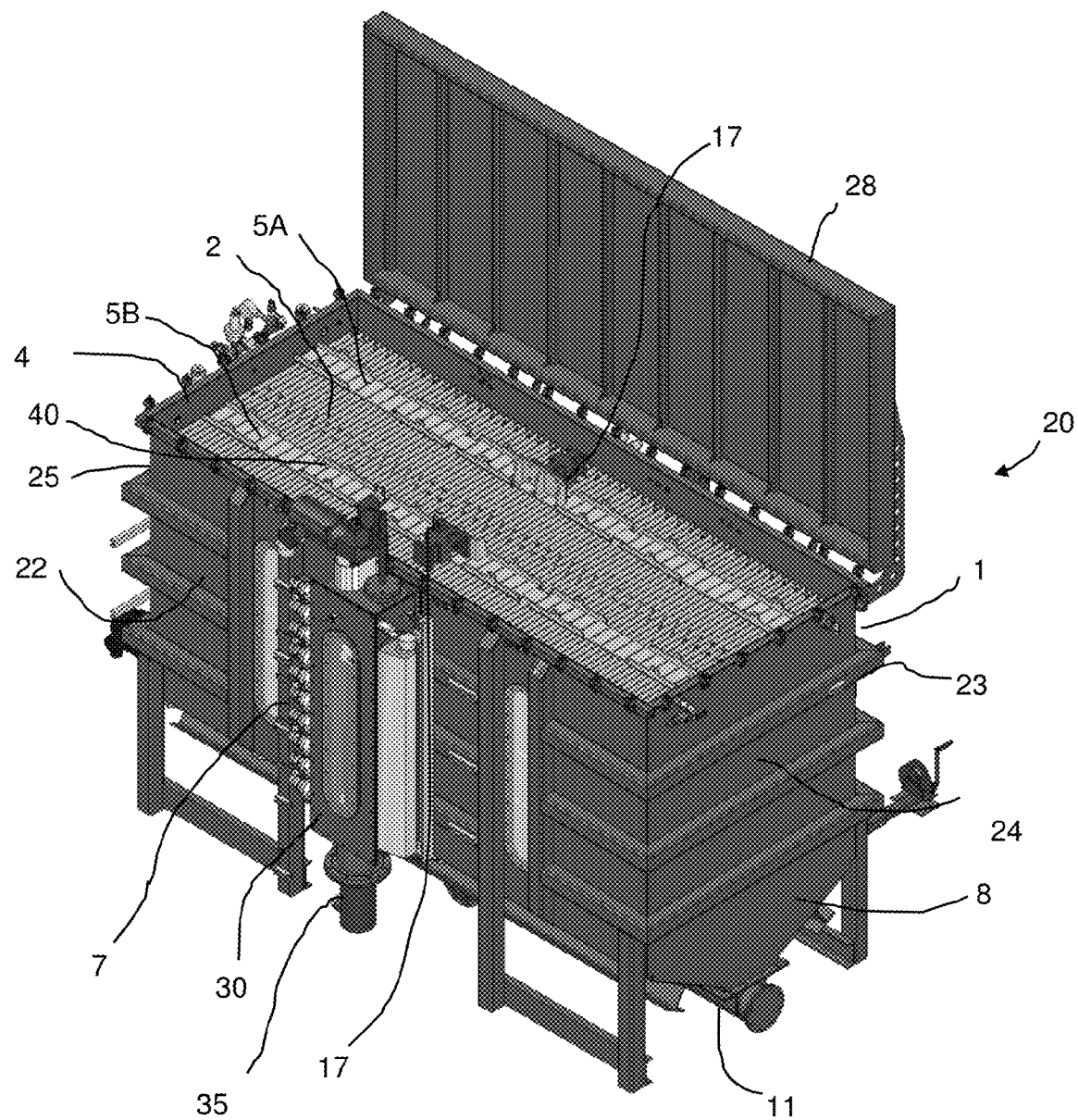
FIG. 1 is a perspective view of an apparatus for separating oil-based drilling fluid.
Figure 2:
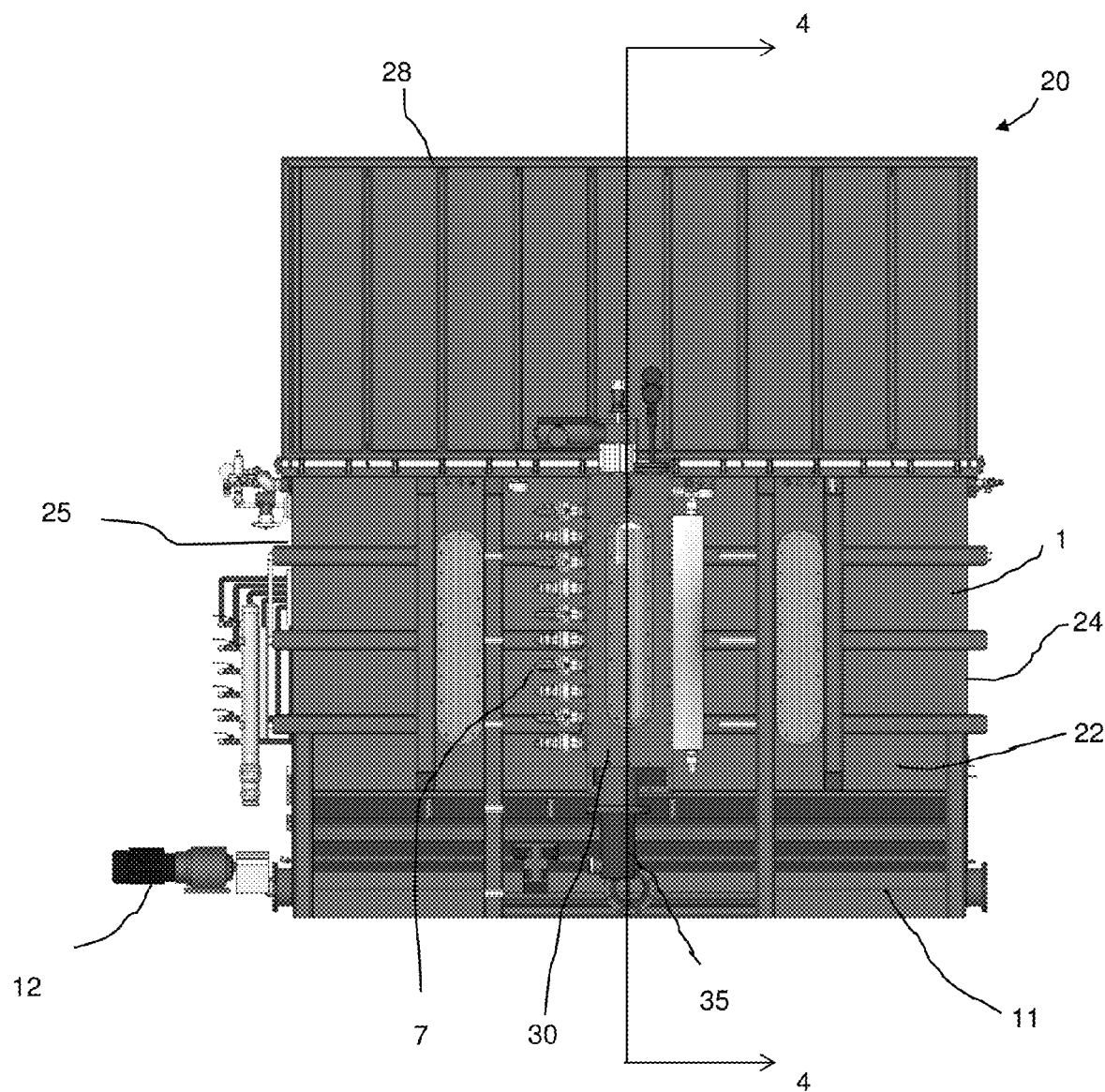
FIG. 2 is a side view of the apparatus shown in FIG. 1.
Figure 3:
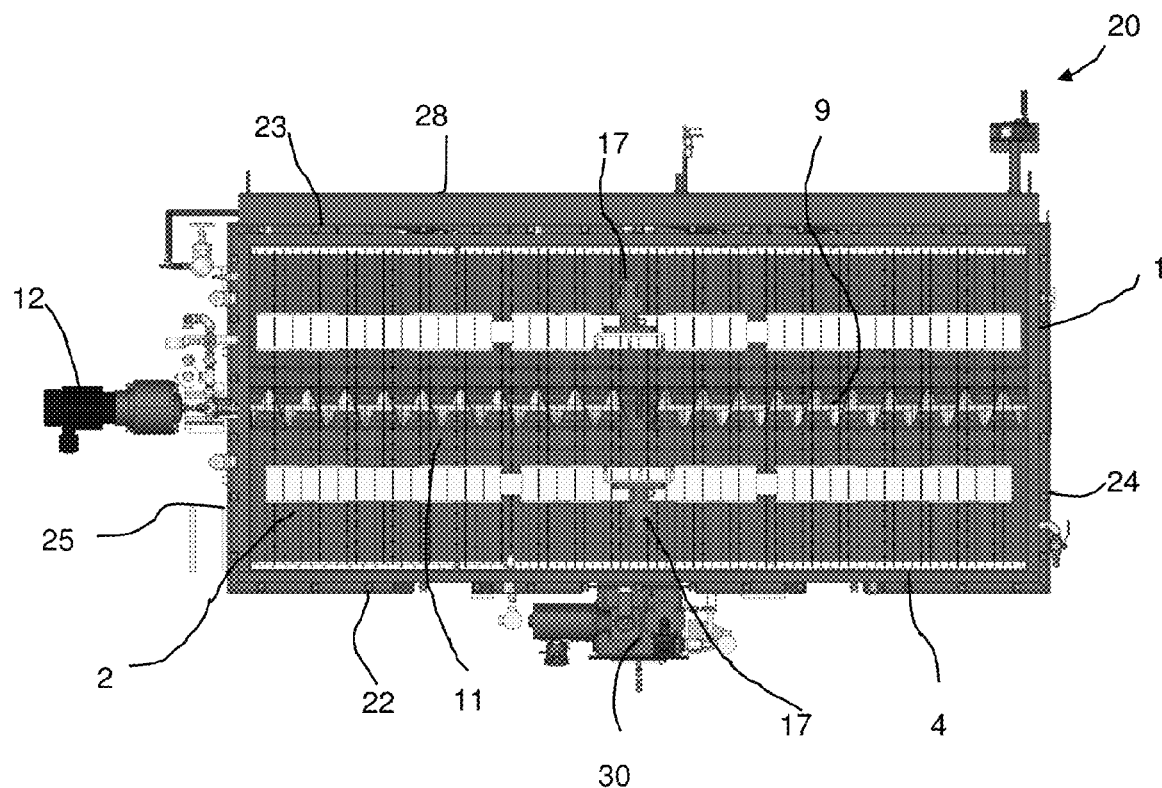
FIG. 3 is a top view of the apparatus shown in FIG. 1.

FIGS. 1 through 3 illustrate a separation apparatus 20 for removing hydrocarbon from cuttings (including fines and rock solids) in oil-based drilling fluids. Electrokinetics in conjunction with mechanical pneumatic vibration is used to influence the movement of hydrocarbons within the drill fluids. Direct current (DC) electricity provides the primary force in the form of electrokinetic phenomena and the mechanical hydraulic vibration is used to address the removal of the native clays/drill solids from the drilling fluid, degassing the electrified plates and assisting in collection of the drilling fluids. By using the apparatus 20 to apply an electrical field to a volume of oil based drilling mud in order to segregate the hydrocarbon from the drilling fluid and corresponding clay fines, a hydrocarbon supernatant is formed that is clear of solid particles.

The apparatus 20 can include a housing 1 and a set of parallel-spaced electrode plates 2 with each electrode plate 2. The housing 1 can form a water tight enclosure with two side walls 22, 23 and two end walls 24, 25. The side walls 22, 23 can be longer than the end walls 24, 25 so that the housing forms a long chamber.

The electrode plates 2 can be formed of stainless steel, carbon steel or aluminum and be insulated from the housing 1 by the use of a non-conductive liner 4 that covers the interior surfaces of the side walls 22, 23 of the housing 1 so that the non-conductive lining 4 is positioned between the edges of the electrode plates 2 and the side walls 22, 23 of the housing 1, preventing the electrode plates 2 from coming into contact with the inside surfaces of the side walls 22, 23 of the housing 1. In one aspect, the non-conductive liner 4 could be made of ultra-high-molecular-weight polyethylene (UHMWPE).

Figure 5:
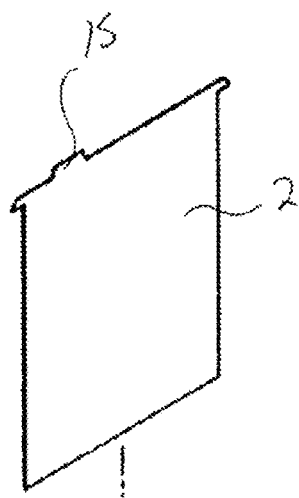
FIG. 5 is a perspective view of an electrode plate.

Each of the electrode plates 2 can be a plate as shown in FIG. 5. When the electrode plate 2 is placed in the housing 1, each electrode plate 2 can extend between the side walls 22, 23 of the housing 1. In one aspect, the electrode plates 2 can be flat. In other aspects, the electrode plates 2 may be corrugated. When they are positioned in the housing 1, the electrode plates 2 can be provided parallel to one another and oriented vertically so that a spacing is formed between adjacent electrode plates 2 and the electrode plates 2 are positioned spaced parallel from one another running along substantially the entire length of the housing 1 from a first end wall 24 of the housing 1 to a second end wall 25. In one aspect, the spacing between adjacent electrode plates 2 could be between 0.25 inches and 3. In a further aspect, the electrode plates can be between 0.25 and 2 inches and in one aspect substantially 1.5 inches apart. In this manner, the electrode plates 2 are parallel spaced a distance between 0.25 inches and 3 inches along substantially an entire length of the housing 1.

As best shown in FIG. 5, each electrode plate 2 can have an ear 15 that extends above drilling fluid when the drilling fluid is provided in the housing 1.

The electrode plates 2 can be connected via a top mounted bussbars 5A, 5B. Typically, the bussbars 5A, 5B are connected to the electrode plates 2 by the ears 15 on the electrode plates 2. Every other electrode plate 2 in the set can be connected to a first bussbar 5A and the remaining electrode plates 2 are connected to the second bussbar 5B. This can be achieved, in one aspect, by having the ears 15 of every other electrode plate 2 aligned on one side of the housing 1 and connected to the first bussbar 5A and all the remaining electrode plates 2 having their ears 15 aligned and positioned on an opposite side of the housing 1 to be connected to the second bussbar 5B. The bussbars 5A, 5B can be wired to a DC power supply so that every other electrode plate 2 is positively charged by applying a positive voltage to the first bussbar 5A and the remaining electrode plates 2 are negatively charged by applying a negative voltage to the second bussbar 5B, creating a circuit between the electrode plates 2 and generating the applied field strength across the electrode plates 2.

By having the electrode plates 2 spaced close together and parallel and where each electrode plate 2 has a relatively large surface area, testing has found that placing an amperage between the electrode plates of between 0.1 amp and 10 amps provides good separation of drilling fluid. This high surface area per volume of drilling fluid where the current has to travel between 0.25 inches to 3 inches through the drilling fluid to reach the negatively charged electrode plate 2 has been found to result in excellent separation of the drilling fluid.

Experimentation has shown good separation of the drilling fluid when the electrode surface area per cubic meter of drilling fluid being treated is between 315 $m^2$ per $m^3$ of oil-based drilling fluid and 27 $m^2$ per $m^3$ of oil-based drilling fluid. These numbers are calculated as shown in Table 1.

TABLE 1

| .25" Gap between electrodes | | 3" Gap between electrodes | |
| --- | --- | --- | --- |
| Plates | 382 | Plates | 47 |
| SA | 37.24 in2 one side | SA | 37.24 in2 one side |
| | 2.40198 m2 | | 2.40198 m2 |
| Volume | 5828 L | Volume | 8422 L |
| | 5.828 m3 | | 8.422 m3 |
| Current Density | | | |
| | Amps | | Amps |
| 0.1 | 5.45E−05 A/m2 | 0.1 | 0.000443 A/m2 |
| 0.5 | 0.000272 A/m2 | 0.5 | 0.002214 A/m2 |
| 10 | 0.00545 A/m2 | 10 | 0.04429 A/m2 |
| S.A./V (Electrode Surface Area per cubic meter of oil based mud) | | | |
| 315 m2 per m3 of OBM (oil based mud) | | 27 m2 per m3 of OBM (oil based mud) | |
| CD/V | | | |
| 0.1 | 9.35E−06 CD per m3 of OBM | 0.1 | 5.26E−05 CD per m3 of OBM |
| 0.5 | 4.68E−05 | 0.5 | 2.63E−04 |
| 10 | 0.000935 | 10 | 5.26E−03 |

Vibrator(s) 17 such as a pneumatic hammer can be provided in physical contact with the electrodes plates 2 so that the vibrators 17 can be used to vibrate the electrode plates 2.

In one aspect, fluid can be removed from the housing 1 after the separation has occurred using a plurality of outlet ports 7 provided in the housing 22 at different heights. The outlet ports 7 are positioned so that they can be opened down to different levels to drain an upper stratification layer that is high in hydrocarbons but low in ultra fine particles from the top portion of the housing 1. By having the outlet ports 7 extend towards from near a top of the housing 1, a user can choose how low to drain the upper stratification layer from the housing 1, leaving behind lower layers with less hydrocarbon and/or more ultra fines suspended in them.

Figure 4:
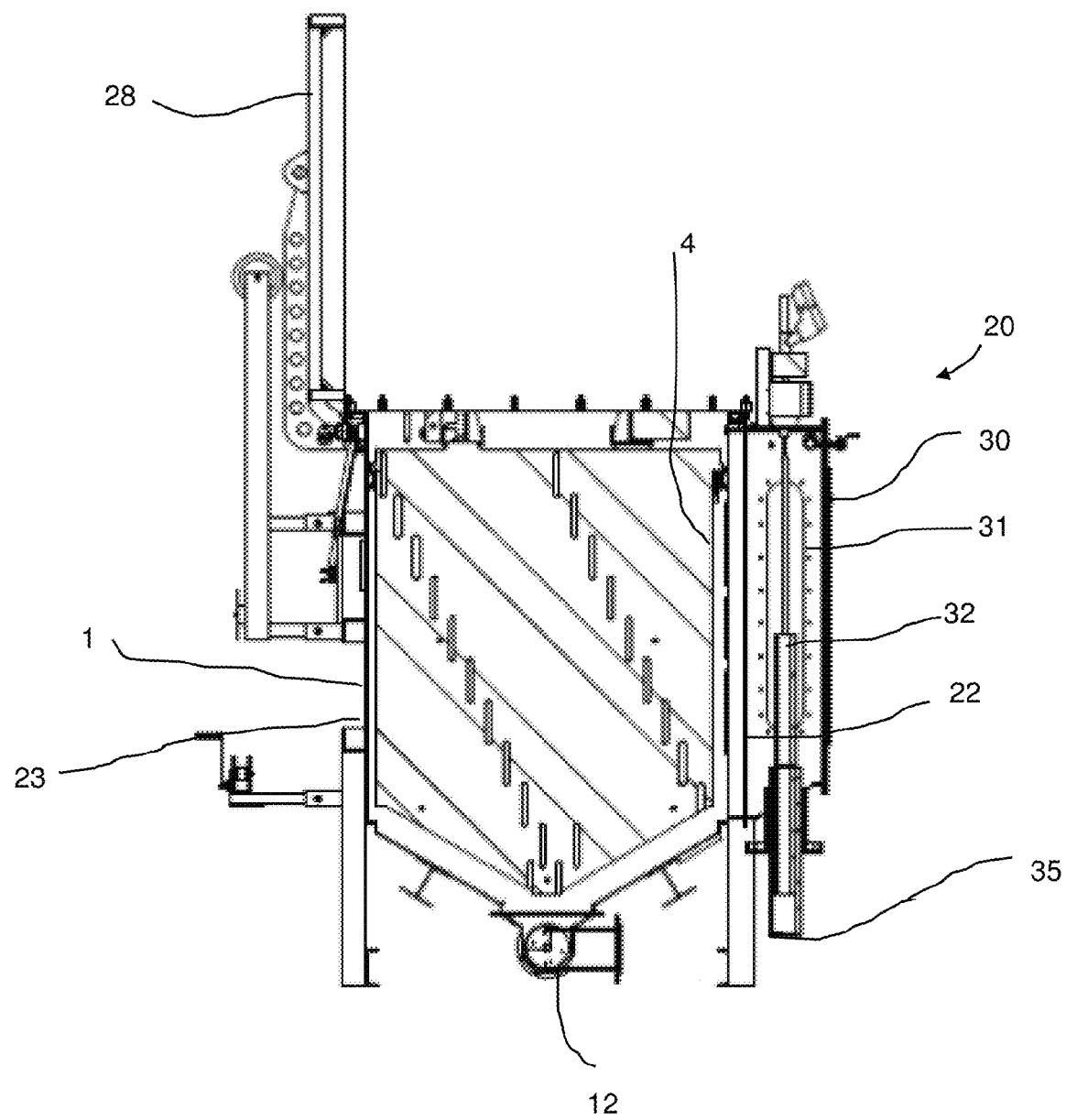
FIG. 4 is a side section view of the apparatus taken along line 2-2.

In another aspect, a skimmer 30 can be provided to remove a top layer of fluid from the housing 1 after the drilling fluid has been treated. FIG. 4 shows a side section view of the skimmer 30. The skimmer 30 can include a clear well 31 that is in fluid communication with the housing 1 and runs the depth of the side wall 22 the skimmer 30 is installed on. Inside the skimmer 30 a substantially vertical telescoping tube 32 is provided in the clear well 31. The telescoping tube 32 can be raised so that the top of the telescoping tube 32 is above the surface of the fluid being treated and the lowered below the surface of the treating fluid so that treated fluid will enter the telescoping tube 32 where it will be routed on an outlet line 35 and removed from the apparatus 20. The top of the telescoping tube 32 can be lowered down to the level where a person wants to drain the top layer out of the housing 1 and all the fluid above the top of the telescoping tube 32 will drain into the open top of the telescoping tube 32 and out of the apparatus 20.

In one aspect, the telescoping of the telescoping tube 32 could be electronically controlled. An electronic specific gravity reader could read the specific gravity of the treated fluid in the housing 1 and the depth where a targeted specific gravity of the fluid is determined (identifying where a upper layer of hydrocarbon supernatant ends) could be used to lower the top of the telescoping tube 32 to this identified depth, causing this upper layer of fluid to drain out of the apparatus 20 and the leaving behind the denser, less desirable fluid.

A hopper 8 can be provided on a bottom of the housing 1 so that solids that settle in the housing 1 can collect in the hopper 8 The hopper 8 can route these settling solids to a trough 11 positioned at the bottom of the hopper 8. Inside this trough 11, an auger 9 can be provided to move solids that have settled into the hopper 8 and been directed into the trough 11 towards a drain port 12 where the solids can be removed from the apparatus 20.

The apparatus 20 can have a lid 28 so that a headspace 40 above the electrode plates 2 in the housing 1 can be created when the lid 28 is closed. The lid 28 and the housing 1 can form a seal so that the interior of the housing is hermetically sealed when the lid 22 is closed, preventing air and other gases from entering and exiting the top of the housing 1. A blanket of nitrogen can be provided in this headspace 40 to prevent an buildup of oxygen in the headspace 40 as a result of anode/cathode reactions occurring in the housing 1 and allowing the apparatus 20 to meet a 'Type X' designation so that it may be used in hazardous environments. The headspace 40 inside of the apparatus 20 can be continuously monitored by an oxygen sensor. If the oxygen sensor determines that the level of oxygen in the headspace 40 reaches an undesired level, more nitrogen can be routed into the headspace 40 in order to reduce the oxidizing agent level and eliminate a possible explosion in the headspace 40.

Additionally, the sealing of the interior space of the housing 1 by the lid 28 allows the fluid in the housing 1 to be pressurized during operation of the apparatus 20. In one aspect, the nitrogen in the headspace 40 can be pressurized so that the pressure in the housing 1 is above atmospheric pressure. In one aspect, the pressure in the housing 1 can be between 1 to 5 psi above atmospheric pressure.

In operation, a batch of drilling fluid can be introduced into the housing 1 so that the drilling fluid is between the parallel electrode plates 2. An electric field can then be generated between the electrode plates 2 to subject the batch of drilling fluid in the housing 1 to an electro-separation stage. A DC voltage can be applied across the electrode plates 2 to create an electric field between the electrode plates 2 that passes through the batch of drilling fluid in the housing 1. In one aspect, it has been determined that using an amperage of approximately 0.1 Amperes is sufficient to cause electro-separation of the drilling fluid. In another aspect, the current used may be in the range from 0.1 Amperes to 10 Amperes. In one aspect, the current being passed between the electrodes plates 2 can be maintained at a substantially constant level, while the voltage is slowly varied to keep the current substantially constant. Typically, as the hydrocarbons and solids separate in the drilling fluid, the voltage can be decreased to keep the amperage constant. As the solids settle out, the current can more easily pass through these condensed solids that are forming near the bottom of the housing.

The electric field applied between the electrode plates 2 can cause the separation of the drilling fluid in the batch through the use of the process of electrokinetics to destabilize the bonds between the hydrocarbon, the fines and other cuttings and the drilling fluid. Electrokinetics involves the processes of electrophoresis, dielectrophoresis, electromigration and electroosmosis. Electrophoresis is the primary phenomenon which occurs in the drilling fluid. Electrophoresis involves the movement of charged particles through a fluid medium under the influence of an electrical field. This process acts to reduce ultra-fine clay particles in the drilling fluid. Dielectrophoresis involves the movement of uncharged particles under a non-uniform electrical field. This is dependent on the fluid medium, particle properties, particle size and gradient of the voltage field. Electromigration involves the movement of ions towards the electrodes of opposite charge. The electric field destabilizes the emulsion, allowing hydrocarbons to be released. Electroosmosis involves the movement of water from anode (+) to cathode (−). Applied DC current breaks any bonds that water may have with other particles and allows it to migrate within the drilling fluid.

During this electro-separation stage, the electric field can be maintained for a period of time, allowing the electrokinetic effect to act on the drilling fluid and the hydrocarbon to separate from the fines and cuttings. In one aspect, this could be a few hours or more, however, the amount of time will vary on the size of the housing 1, number of electrode plates 2, amount of drilling fluid, etc. As the electric field continues to be passed through the drilling fluid, hydrocarbon will rise to the surface of the drilling fluid.

As the drilling fluid separates, the voltage being passed between the electrode plates 2 can be decreased to maintain the amperage between the electrode plates at a substantially constant amperage.

In some aspects, the pressure in the housing 1 can be increased above atmospheric pressure to aid in the separation of the drilling fluid. In one aspect, this pressure could be increased between 1 psi and 5 psi above atmospheric pressure. In one aspect, the nitrogen supplied to the headspace 40 can be supplied to the headspace 40 at an elevated pressure to increase the pressure in the housing 1 above ambient pressure.

Periodically, the batch of drilling fluid can be subjected to a short vibration stage by using the vibrator 6 to vibrate the electrode plates 2. This can exacerbate the fluid medium into a highly vibratory state in order to release and free fluid that is trapped throughout the medium or that has collected along the electrode plates 2 because of high surface tension.

Additionally, the vibratory effect created by the vibrator 6 can provide cleaning benefits for the electrode plates 2 themselves. By vibrating the electrode plates 2, particles that have started to form on the surface of the electrode plates 2 can be vibrated loose from the electrode plates 2. By reducing the amount of particles that form on the electrode plates 2, a stronger electrical field can be maintained through the drilling fluid.

In one aspect, the polarity of the electrode plates 2 can be reversed periodically and the fluid in the apparatus 20 can be subjected to a second electro-separation stage. If a positive voltage had been applied to the bussbar 5A and a negative voltage applied to the bussbar 5B in the first electro-separation stage, this can be reversed for the second electro-separation stage, and vice versa. By reversing the polarity, the electrode plates 2 that acted as the anodes during the first electro-separation stage will now act as cathodes and the electrode plates 2 that acted as cathodes during the first electro-separation cycle will now act as anodes. Reversing the polarity of the electrode plates 2 for the second electro-separation stage can provide benefits with respect to preventing possible electroplating of the electrode plates 2 and maintaining a maximized electrical field. If the same electrode plates 2 always act as cathodes, particles can build up on these electrode plates 2.

The second electro-separation stage can be maintained for a set period of time (in some cases this may be a few hours or more depending on the size of the electrode plates 2).

During the processing of the batch of drilling fluid, the batch of drilling fluid will separate into a number of stratified layers in the housing 1. An upper stratification layer or supernatant layer containing a high concentration of hydrocarbon will rise to the top of the housing 1 and collect on the surface of the drilling fluid 1. Below the upper stratification layer, a medium stratification layer will occur. This medium stratification layer will contain a low percentage of particles (fines and cuttings). The separation of the upper stratification layer and the medium stratification layer suggests that the two layers have varying densities. Below the medium stratification layer will lay a lower stratification layer. The fluid mass layer contains highly viscous semi-consolidated invert drilling fluid mass. The majority of the fines and cuttings from the drilling fluid along with the any thickening agents (barite) will likely be contained in this fluid mass layer.

After the batch of drilling fluid is treated during the electro-separation stage in the apparatus 1, the voltage across the electrode plates 2 can be stopped and the upper stratification layer can be removed from the housing 1 via the appropriate ports 7 or the skimmer 30.

The lower stratification layer containing the solids will sink to the bottom of the housing 1 and will collect in the hopper 8 and can be moved through the trough 11 by the auger 9 to be removed from the apparatus 20 through the drain port 12.

During the separation of the drilling fluid by the apparatus 20, the oxygen level in the headspace 40 can be monitored continuously using the oxygen sensor. If the oxygen level rises above the desired level during the separation of the drilling fluid, nitrogen can be introduced into the headspace 40 creating a nitrogen blanket, reducing the oxidization agent and eliminating the possibility of an explosion in the headspace 40.

The apparatus 20 can produce hydrocarbon from the drilling mud at an extremely high rate (50% or greater) in comparison to the original invert drilling fluid, therefore reducing the disposal volume considerably. Through the removal of ultra-fines and additives from drilling fluids, the density and viscosity of the fluid is decreased, while the relative hydrocarbon content is increased. This reduces the excessive dilution required when reconditioning drilling fluid and effectively extends the life cycle of the drilling fluid. The apparatus 20 reduces waste disposal volumes and associated costs meeting both operational and environmental goals.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method for separating drilling fluid comprising:
providing a housing;
providing a plurality of parallel spaced apart electrode plates in the housing, each electrode plate oriented substantially vertically;
filling the housing with a batch of drilling fluid so that the drilling fluid fills up spacings between the electrode plates;
subjecting the drilling fluid to an electro-separation cycle by placing a DC voltage across the electrode plates so that adjacent plates have opposite polarity and an electric field is created in the drilling fluid in the spacings between the electrode plates;
periodically subjecting the drilling fluid to a vibration cycle by inducing vibrations in the drilling fluid; and
using a substantially vertically oriented telescoping tube to remove an upper layer of fluid from the housing.

2. The method of claim 1 wherein the electrode plates are spaced between 0.25 inches and 3 inches apart.

3. The method of claim 1 wherein the electrode plates are spaced between 0.25 inches and 2 inches apart.

4. The method of claim 1 wherein the electrode plates are spaced substantially 1.5 inches apart.

5. The method of claim 1 wherein the ratio of surface area of the electrode in the apparatus to the volume of oil based drilling mud is between 315 $m^2$ per $m^3$ of oil-based drilling fluid and 27 $m^2$ per $m^3$ of oil-based drilling fluid.

6. The method of claim 1 further comprising increasing the pressure in the housing above atmospheric pressure during the electro-separation cycle.

7. The method of claim 6 wherein the pressure in the housing is increased between 1 and 5 psi.

8. The method of claim 1 wherein a substantially constant amperage is maintained by lowering the voltage applied across the electrode plates as the drilling fluid separates.

9. The method of claim 1 further comprising providing a non-conductive liner between the electrode plates and interior side walls of the housing to insulate the electrode plates from the housing.

10. The method of claim 9 wherein the non-conductive liner is formed of an ultra-high-molecular weight polyethylene.

11. The method of claim 1 wherein the polarity of the electrode plates is reversed during the electro-separation cycle.

12. The method of claim 1 wherein the upper layer is a supernatant layer comprising hydrocarbon.

13. The method of claim 1 further comprising determining the density of the fluid in the housing at different depths and lowering the top of the telescoping tube to a depth where a specific gravity of the fluid reaches a predetermined amount.

14. The method of claim 1 further comprising removing solids that have separated out of the batch of drilling fluid from a bottom of the housing.

15. The method of claim 14 further comprising providing a hopper and a trough at a bottom of the housing; providing an auger in the trough; and removing solids that have settled into the trough towards a drain port using the auger.

16. The method of claim 1 wherein the vibration cycle is induced by a pneumatic hammer in physical contact with the electrode plates.

17. The method of claim 1 further comprising: providing a headspace above the batch drilling fluid in the housing; introducing nitrogen into the headspace; monitoring the oxygen levels in the headspace; and if oxygen levels in the headspace rise above a desired level, increasing the amount of nitrogen in the headspace.

18. The method of claim 17 wherein the nitrogen in the headspace is increased during the electro-separation cycle to increase the pressure in the drilling fluid above atmospheric pressure.

19. A method for separating drilling fluid comprising:
providing a housing;
providing a plurality of parallel spaced apart electrode plates in the housing, each electrode plate oriented substantially vertically;
insulating the electrode plates from the housing by providing a non-conductive liner between the electrode plates and interior side walls of the housing;
filling the housing with a batch of drilling fluid so that the drilling fluid fills up spacings between the electrode plates;
subjecting the drilling fluid to an electro-separation cycle by placing a DC voltage across the electrode plates so that adjacent plates have opposite polarity and an electric field is created in the drilling fluid in the spacings between the electrode plates;
periodically subjecting the drilling fluid to a vibration cycle by inducing vibrations in the drilling fluid; and
removing an upper layer of fluid from the housing.

20. The method of claim 19 wherein the electrode plates are spaced between 0.25 inches and 3 inches apart.

21. The method of claim 19 wherein the electrode plates are spaced between 0.25 inches and 2 inches apart.

22. The method of claim 19 wherein the electrode plates are spaced substantially 1.5 inches apart.

23. The method of claim 19 wherein the ratio of surface area of the electrode in the apparatus to the volume of oil based drilling mud is between 315 $m^2$ per $m^3$ of oil-based drilling fluid and 27 $m^2$ per $m^3$ of oil-based drilling fluid.

24. The method of claim 19 further comprising increasing the pressure in the housing above atmospheric pressure during the electro-separation cycle.

25. The method of claim 24 wherein the pressure in the housing is increased between 1 and 5 psi.

26. The method of claim 19 wherein a substantially constant amperage is maintained by lowering the voltage applied across the electrode plates as the drilling fluid separates.

27. The method of claim 19 wherein the non-conductive liner is formed of an ultra-high-molecular weight polyethylene.

28. The method of claim 19 wherein the polarity of the electrode plates is reversed during the electro-separation cycle.

29. The method of claim 19 wherein the upper layer is a supernatant layer comprising hydrocarbon.

30. The method of claim 19 further comprising removing solids that have separated out of the batch of drilling fluid from a bottom of the housing.

31. The method of claim 30 further comprising providing a hopper and a trough at a bottom of the housing; providing an auger in the trough; and removing solids that have settled into the trough towards a drain port using the auger.

32. The method of claim 19 wherein the vibration cycle is induced by a pneumatic hammer in physical contact with the electrode plates.

33. The method of claim 19 further comprising: providing a headspace above the batch drilling fluid in the housing; introducing nitrogen into the headspace; monitoring the oxygen levels in the headspace; and if oxygen levels in the headspace rise above a desired level, increasing the amount of nitrogen in the headspace.

34. The method of claim 33 wherein the nitrogen in the headspace is increased during the electro-separation cycle to increase the pressure in the drilling fluid above atmospheric pressure.

35. A method for separating drilling fluid comprising:
providing a housing;
providing a plurality of parallel spaced apart electrode plates in the housing, each electrode plate oriented substantially vertically;
filling the housing with a batch of drilling fluid so that the drilling fluid fills up spacings between the electrode plates;
subjecting the drilling fluid to an electro-separation cycle by placing a DC voltage across the electrode plates so that adjacent plates have opposite polarity and an electric field is created in the drilling fluid in the spacings between the electrode plates;
periodically subjecting the drilling fluid to a vibration cycle by inducing vibrations in the drilling fluid;
removing an upper layer of fluid from the housing;
providing a headspace above the batch drilling fluid in the housing;
introducing nitrogen into the headspace while the drilling fluid is being subjected to the electro-separation cycle;
monitoring the oxygen levels in the headspace; and
if oxygen levels in the headspace rise above a desired level, increasing the amount of nitrogen in the headspace.

36. The method of claim 35 wherein the electrode plates are spaced between 0.25 inches and 3 inches apart.

37. The method of claim 35 wherein the electrode plates are spaced between 0.25 inches and 2 inches apart.

38. The method of claim 35 wherein the electrode plates are spaced substantially 1.5 inches apart.

39. The method of claim 35 wherein the ratio of surface area of the electrode in the apparatus to the volume of oil based drilling mud is between 315 m$^2$ per m$^3$ of oil-based drilling fluid and 27 m$^2$ per m$^3$ of oil-based drilling fluid.

40. The method of claim 35 further comprising increasing the pressure in the housing above atmospheric pressure during the electro-separation cycle.

41. The method of claim 35 wherein the pressure in the housing is increased between 1 and 5 psi.

42. The method of claim 35 wherein a substantially constant amperage is maintained by lowering the voltage applied across the electrode plates as the drilling fluid separates.

43. The method of claim 35 wherein the polarity of the electrode plates is reversed during the electro-separation cycle.

44. The method of claim 35 wherein the upper layer is a supernatant layer comprising hydrocarbon.

45. The method of claim 35 wherein the vibration cycle is induced by a pneumatic hammer in physical contact with the electrode plates.

46. The method of claim 35 wherein the nitrogen in the headspace is increased during the electro-separation cycle to increase the pressure in the drilling fluid above atmospheric pressure.

47. A method for separating drilling fluid comprising:
providing a housing;
providing a plurality of parallel spaced apart electrode plates in the housing, each electrode plate oriented substantially vertically;
providing a hopper and a trough at a bottom of the housing;
providing an auger in the trough;
filling the housing with a batch of drilling fluid so that the drilling fluid fills up spacings between the electrode plates;
subjecting the drilling fluid to an electro-separation cycle by placing a DC voltage across the electrode plates so that adjacent plates have opposite polarity and an electric field is created in the drilling fluid in the spacings between the electrode plates;
periodically subjecting the drilling fluid to a vibration cycle by inducing vibrations in the drilling fluid;
removing an upper layer of fluid from the housing; and
removing solids that have settled into the trough towards a drain port using the auger.

48. The method of claim 47 wherein the electrode plates are spaced between 0.25 inches and 3 inches apart.

49. The method of claim 47 wherein the electrode plates are spaced between 0.25 inches and 2 inches apart.

50. The method of claim 47 wherein the electrode plates are spaced substantially 1.5 inches apart.

51. The method of claim 47 wherein the ratio of surface area of the electrode in the apparatus to the volume of oil based drilling mud is between 315 m$^2$ per m$^3$ of oil-based drilling fluid and 27 m$^2$ per m$^3$ of oil-based drilling fluid.

52. The method of claim 47 further comprising increasing the pressure in the housing above atmospheric pressure during the electro-separation cycle.

53. The method of claim 47 where in the pressure in the housing is increased between 1 and 5 psi.

54. The method of claim 47 wherein a substantially constant amperage is maintained by lowering the voltage applied across the electrode plates as the drilling fluid separates.

55. The method of claim 47 wherein the polarity of the electrode plates is reversed during the electro-separation cycle.

56. The method of claim 47 wherein the upper layer is a supernatant layer comprising hydrocarbon.

57. The method of claim 47 wherein the vibration cycle is induced by a pneumatic hammer in physical contact with the electrode plates.

58. A method for separating drilling fluid comprising:
providing a housing;
providing a plurality of parallel spaced apart electrode plates in the housing, each electrode plate oriented substantially vertically;
filling the housing with a batch of drilling fluid so that the drilling fluid fills up spacings between the electrode plates;
subjecting the drilling fluid to an electro-separation cycle by placing a DC voltage across the electrode plates so that adjacent plates have opposite polarity and an electric field is created in the drilling fluid in the spacings between the electrode plates;
periodically subjecting the drilling fluid to a vibration cycle by inducing vibrations in the drilling fluid; and
removing an upper layer of fluid from the housing,
wherein the vibration cycle is induced by a pneumatic hammer in physical contact with the electrode plates.

59. The method of claim 58 wherein the electrode plates are spaced between 0.25 inches and 3 inches apart.

60. The method of claim 58 wherein the electrode plates are spaced between 0.25 inches and 2 inches apart.

61. The method of claim 58 wherein the electrode plates are spaced substantially 1.5 inches apart.

62. The method of claim 58 wherein the ratio of surface area of the electrode in the apparatus to the volume of oil based drilling mud is between 315 m$^2$ per m$^3$ of oil-based drilling fluid and 27 m$^2$ per m$^3$ of oil-based drilling fluid.

63. The method of claim 58 further comprising increasing the pressure in the housing above atmospheric pressure during the electro-separation cycle.

64. The method of claim 63 where in the pressure in the housing is increased between 1 and 5 psi.

65. The method of claim 58 wherein a substantially constant amperage is maintained by lowering the voltage applied across the electrode plates as the drilling fluid separates.

66. The method of claim 58 wherein the polarity of the electrode plates is reversed during the electro-separation cycle.

67. The method of claim 58 wherein the upper layer is a supernatant layer comprising hydrocarbon.

68. The method of claim 58 further comprising removing solids that have separated out of the batch of drilling fluid from a bottom of the housing.

69. A method for separating drilling fluid comprising:
providing a housing;
providing a plurality of parallel spaced apart electrode plates in the housing, each electrode plate oriented substantially vertically;
filling the housing with a batch of drilling fluid so that the drilling fluid fills up spacings between the electrode plates;
subjecting the drilling fluid to an electro-separation cycle by placing a DC voltage across the electrode plates so that adjacent plates have opposite polarity and an electric field is created in the drilling fluid in the spacings between the electrode plates;
periodically subjecting the drilling fluid to a vibration cycle by inducing vibrations in the drilling fluid; and
removing an upper layer of fluid from the housing,
wherein a substantially constant amperage is maintained by lowering the voltage applied across the electrode plates as the drilling fluid separates.

70. The method of claim 69 wherein the electrode plates are spaced between 0.25 inches and 3 inches apart.

71. The method of claim 69 wherein the electrode plates are spaced between 0.25 inches and 2 inches apart.

72. The method of claim 69 wherein the electrode plates are spaced substantially 1.5 inches apart.

73. The method of claim 69 wherein the ratio of surface area of the electrode in the apparatus to the volume of oil based drilling mud is between 315 m$^2$ per m$^3$ of oil-based drilling fluid and 27 m$^2$ per m$^3$ of oil-based drilling fluid.

74. The method of claim 69 further comprising increasing the pressure in the housing above atmospheric pressure during the electro-separation cycle.

75. The method of claim 74 wherein the pressure in the housing is increased between 1 and 5 psi.

76. The method of claim 69 wherein the polarity of the electrode plates is reversed during the electro-separation cycle.

77. The method of claim 69 wherein the upper layer is a supernatant layer comprising hydrocarbon.

78. The method of claim 69 further comprising removing solids that have separated out of the batch of drilling fluid from a bottom of the housing.

79. The method of claim 69 wherein the vibration cycle is induced by a pneumatic hammer in physical contact with the electrode plates.

* * * * *